United States Patent [19]

Waring

[11] Patent Number: 4,603,580

[45] Date of Patent: Aug. 5, 1986

[54] UNICABLE LIQUID LEVEL SENSING SYSTEM

[75] Inventor: James P. Waring, Rockville, Md.

[73] Assignee: Scandpower, Inc., Bethesda, Md.

[21] Appl. No.: 703,437

[22] Filed: Feb. 20, 1985

[51] Int. Cl.[4] ............................................. G01F 23/22
[52] U.S. Cl. ......................................... 73/295; 340/622
[58] Field of Search .......................... 73/295; 340/622; 374/45, 54; 323/366, 369; 361/284; 338/27; 376/258

[56] References Cited

U.S. PATENT DOCUMENTS

| | | | |
|---|---|---|---|
| 2,702,476 | 2/1955 | DeBoisblanc | 73/295 |
| 3,280,627 | 10/1966 | Cousins et al. | 73/295 |
| 3,964,311 | 6/1976 | Holmen | 73/295 |
| 4,298,430 | 11/1981 | Rolstad et al. | 374/110 |
| 4,319,233 | 3/1982 | Matsuoka | 73/295 |
| 4,406,011 | 9/1983 | Burns | 376/258 |
| 4,418,035 | 11/1983 | Smith | 376/258 |
| 4,439,396 | 3/1984 | Rolstad | 376/247 |
| 4,440,717 | 4/1984 | Bevilacqua et al. | 73/295 |
| 4,449,403 | 5/1984 | McQueen | 73/295 |

*Primary Examiner*—Charles Frankfort
*Assistant Examiner*—Thomas B. Will
*Attorney, Agent, or Firm*—Eric P. Schellin

[57] ABSTRACT

Double-junction thermocouple sensors located at axially spaced measurement zones within an elongated probe are interconnected in series to produce a combined output from differential signals generated by the sensors in response to unequal heating of the junctions. Axial heat flow between measurement zones is controlled to modify the combined output in a corrective direction with respect to a linear function of liquid level between the measurement zones.

8 Claims, 9 Drawing Figures

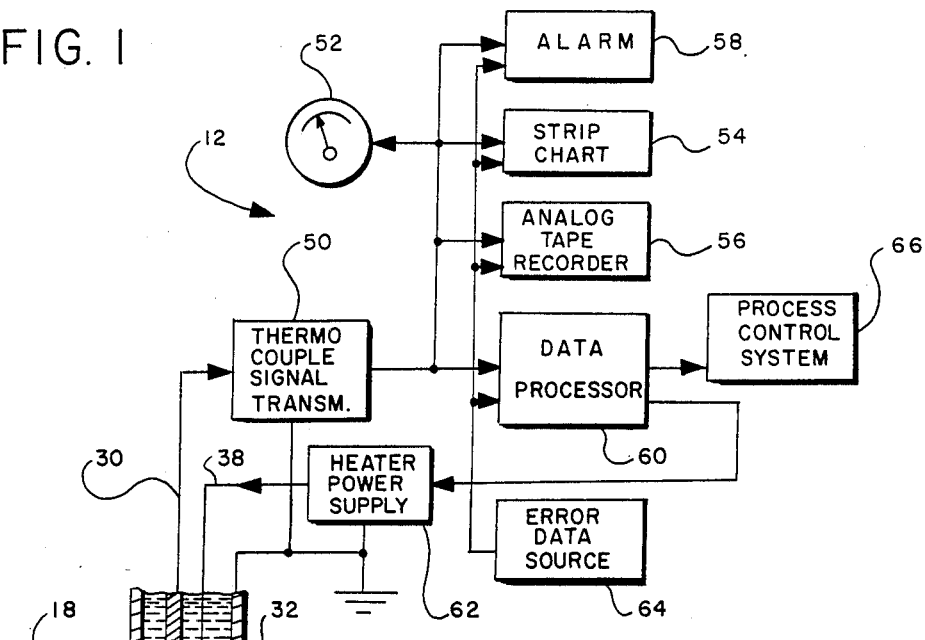
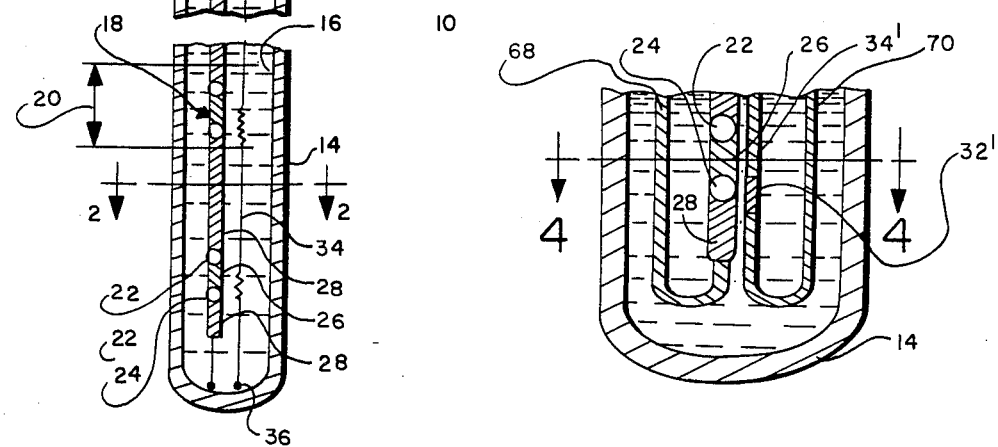
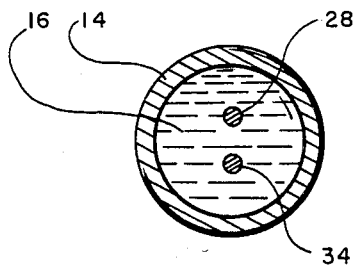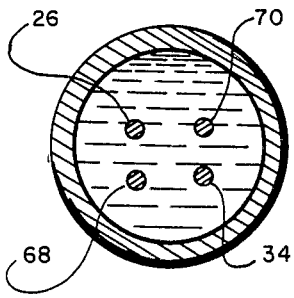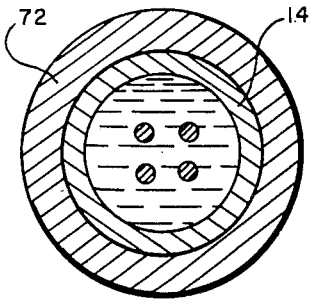

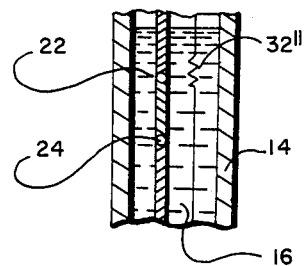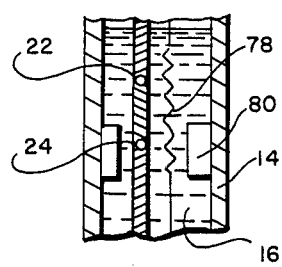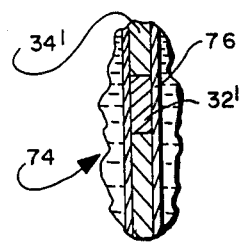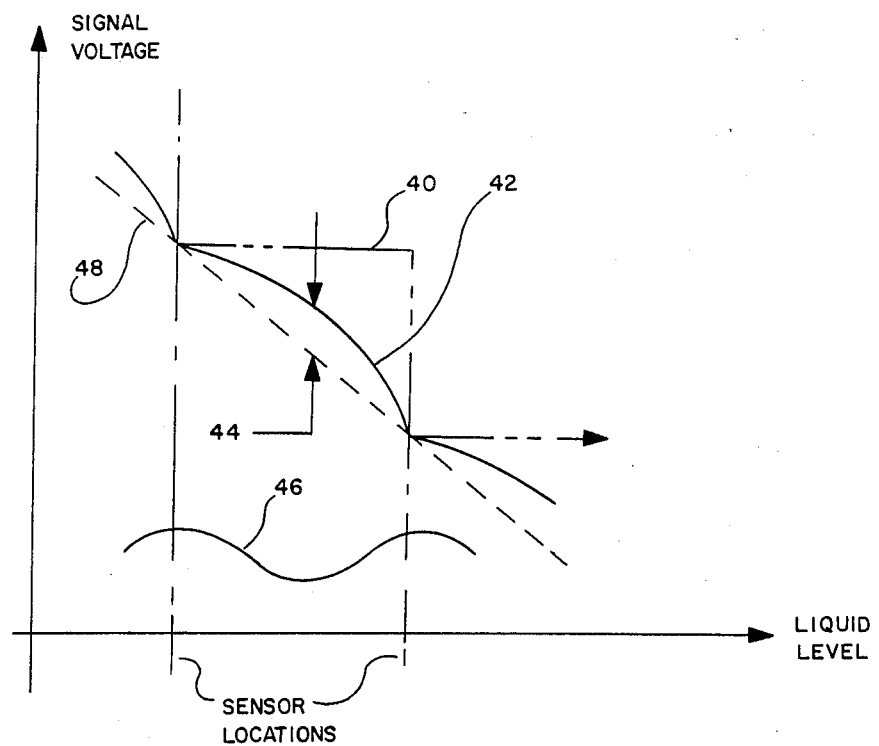

UNICABLE LIQUID LEVEL SENSING SYSTEM

BACKGROUND OF THE INVENTION

This invention relates to a liquid level sensing apparatus and system for use in a wide variety of equipment requiring the monitoring of liquid tanks or containers.

The concept of monitoring liquid in a container by use of thermocouple junctions measuring temperatures at vertically spaced locations to recognize the presence of liquid by heat exchange therewith is already well known as disclosed in U.S. Pat. No. 3,280,627 to Cousins. According to the Cousins patent, all of the temperature sensing thermocouple junctions are interconnected in series and are equally heated by an electrical heating element within a tubular probe to provide a single combined voltage output from the series connected thermocouple junctions. The output of the thermocouple junctions will vary with the level of liquid into which the probe is inserted since each thermocouple junction generates a voltage dependent on localized heat exchange between the liquid body and the internally heated probe.

The foregoing concept, taught in the Cousins patent, of internally heating a probe to generate an output voltage at a thermocouple junction for level sensing purposes is also embodied in a power monitoring probe for a nuclear reactor according to U.S. Pat. No. 4,418,035 to Smith. Each thermocouple junction according to the Smith patent, however, is one of two such junctions forming a differential temperature type of sensor designed to also measure localized power output of the nuclear reactor as a function of the gamma ray heating of the body of the probe embedding the sensors therein as more fully explained in U.S. Pat. No. 4,298,430 to Rolstad et al. Thus, both the Smith and the Rolstad et al patents refer to the use of a plurality of separate sensor cables to respectively monitor local conditions (whether it be power rate or coolant level) at vertically spaced measurement zones. The Rolstad et al patent is made of record in the Smith patent, both patents being owned in common with the present application by the same assignee.

It will be apparent that the use of double junction sensors is of significance in regard to the localized nature of its temperature monitoring function so that separate signal outputs are required for the measurement zones. Although two sets of differential temperature junctions are interconnected in series according to U.S. Pat. No. 4,439,396 to Rolstad, also owned in common with the present application, the two sets of junctions are associated with a single measurement zone to improve signal strength and reduce signal error with respect to the signal output from each single measurement zone. However, the use of multijunction sensors with separate signal cables for each measurement zone had not been deemed to be advantageous for solely monitoring liquid level in a variety of different installations which sometimes require a relatively large number of vertically spaced measurement zones and provide severe spatial restrictions for the probe assembly.

Although single junction sensors interconnected in series, as disclosed in the Cousins patent aforementioned, are more suitable because of the associated single output cable arrangment, such level sensing arrangement is subject to signal error because of varying heat flow and temperature conditions of the liquid between measurement zones. Such signal errors are not capable of being reliably corrected by acumulated error data because of the often unpredictable nature of heat flow conditions within the liquid body being monitored.

It is therefore an important object of the present invention to provide an improved temperature sensing type of liquid level monitoring probe which has the spatial advantages of a single signal cable type of probe without the aforementioned signal error disadvantages.

SUMMARY OF THE INVENTION

In accordance with the present invention, an elongated level sensing probe is provided with a single signal output cable connected to sensors located at a plurality of measurement zones axially spaced along the probe. The cable is formed by the series connection of double junction types of sensors which respectively reduce differential signal voltages in response to unequal heating of the thermocouple junctions. In accordance with certain embodiments of the invention the probe is internally heated by axially spaced, series-connected heating elements restrictively positioned in radial heat transfer relation to only one of the two junctions of each sensor. Alternatively, axial heat flow through the probe body is altered adjacent to one of the two junctions of each sensor to obtain differential heating of the junctions.

The differential signal outputs of the sensors are combined by the series connection of all sensors and such combined output is modified by control over the heat flow between measurement zones, made possible by the aforementioned unequal heating of the junctions. Such combined and modified signal output is more readily corrected in order to closely approximate a linear function of liquid level between measurement zones. Further, by use of a double junction sensors, the differential signal voltages generated by the sensors will be less susceptible to liquid level errors otherwise produced by localized temperature variations in the liquid body being monitored.

BRIEF DESCRIPTION OF DRAWING FIGURES

FIG. 1 is a simplified partial side section view through a liquid level monitoring probe assembly in accordance with one embodiment of the invention, in association with a schematically illustrated signal processing system.

FIG. 2 is a transverse section view taken substantially through a plane indicated by section line 2—2 in FIG. 1.

FIG. 3 is a partial side section view of the probe assembly in accordance with another embodiment of the probe assembly.

FIG. 4 is a transverse section view taken substantially through a plane indicated by section line 4—4 in FIG. 3.

FIG. 5 is a transverse section view showing a modification of the embodiment of FIGS. 3 and 4.

FIGS. 6 and 7 are partial side section views showing yet other embodiments of the probe assembly in accordance with the present invention.

FIG. 8 is an enlarged partial side section view showing a modification of a portion of the probe assemblies shown in FIGS. 1 and 2.

FIG. 9 is a graphical illustration of signal characteristics associated with the present invention.

DETAILED DESCRIPTION OF PREFERRED EMBODIMENTS

Referring now to the drawings in detail, FIG. 1 illustrates one basic embodiment of the invention which includes an axially elongated probe assembly generally referred to by reference numeral 10 and a signal processing and readout system 12 with which it is associated. The probe assembly is adapted to be inserted into a body of liquid in order to monitor its surface level based on the difference between the thermal conductivity of the liquid below its surface and the thermal conductivity of the air or other gaseous atmosphere above the liquid surface. In the illustrated embodiment, the probe assembly has a heat conductive tubular sheathing 14 made of a metal such as stainless steel. The sheathing 14 encloses a body or matrix of heat conducting potting material 16 that is an electrical insulator, such as alumina ($Al_2O_3$) or magnesium oxide (MgO). The potting material or body 16 embeds a plurality of differential temperature sensors 18 located within separate axially spaced zones 20 that are vetically aligned above each other when the probe is vertically inserted into a body of liquid to be monitored. Each of the sensors 18 includes two thermocouple junctions 22 and 24 formed between sections 26 and 28 of dissimilar metal alloys such as cromel and alumel, respectively. In accordance with the present invention, all of the thermocouple junctions are electrically interconnected in series to form a single sensing cable connected to a signal output conductor 30. The combined output signal voltage in conductor 30 will accordingly be the summation of the differential signal voltages generated at the two junctions 22 and 24 of each sensor 18 as a result of temperature differences being sensed at the junctions. The two junctions are therefore unequally heated by a predetermined amount.

In accordance with the embodiment shown in FIGS. 1 and 2, unequal heating of the junctions 22 and 24 is effected through electrical heating elements 32 restrictively positioned within the body 16 only adjacent to the lowermost of the two junctions 24 within each measurement zone 20. The relatively short radial heat flow path between the heating elements 32 and the lowermost junctions 24 will therefore heat the junctions 24 to a higher temperature than the upper cold junctions 22 to produce the differential temperature signals at each measurement zone. The heating elements 32 are interconnected in series by conductors 34 between ground at the lower end 36 of the probe sheathing and a voltage supply line 38. The series connected thermocouple junctions are also connected between ground at the lower end 36 of the sheathing and the signal output conductor 30.

It will be apparent that the sheathing 14 of the probe will act as interface with either the body of liquid or the air thereabove. Thus, the magnitude of the differential signal generated at each measurement zone will depend on the thermal conductivity of the heat sink and/or the radial heat flow path to the fluid surrounding the probe to thereby recognize the presence or absence of liquid. The level of the liquid will therefore determine the number of measurement zones within the liquid body and the corresponding output signal magnitude in conductor 30. Where there is very little axial heat flow between the measurement zones as in the case of series connected thermocouple junctions that are equally heated, an abrupt change in output signal voltage occurs, during liquid level change, at each measurement zone or sensor location as depicted by curve 40 in FIG. 9. However, in accordance with the present invention the variation in signal output is correctively modified by controlling axial heat flow between the sensor locations or measurement zones to provide a more accurate indication of liquid level between the measurement zones as depicted by the modified output signal curve 42 in FIG. 9. Such modified output signal 42 may be corrected by error data 44 obtained, for example, from an empirically determined, cyclically varying function of liquid level as shown by curve 46 in FIG. 9 to produce a corrected signal output that is a substantially linear function of or proportional to liquid level between sensor locations as shown by curve 48 in FIG. 9.

FIG. 1 illustrates the single combined signal output in line 30 being applied to a standard thermocouple signal transmitter 50 within which it is amplified and converted for easy signal processing, readout and control function. The output of transmitter 50 may therefore be displayed on a simple meter 52 or strip chart 54, or recorded by an analog tape recorder 56. The output signal may also be used to trigger an alarm 58 for high or low liquid tank levels and transmitted to a digital data processor 60 through which heater power supply 62 is controlled. By such control over the energy fed to the heating elements 32 from supply 62 through line 38, axial heat flow control may be exercized as aforementioned to correctively modify the output signal changes in output line 30. By appropriate entry of error data from source 64, signal readout may be corrected to approximate a linear function of liquid level between the measurement zones as explained with respect to the graphical illustration of FIG. 9. The output of data processor 60 may also be applied to a process control system 66.

FIGS. 3 and 4 illustrate a modification in the probe assembly wherein electrical return conductors 68 and 70 are connected to the series connected sensors and heating elements, thereby replacing the ground connections to the sheathing 14. The thickness of the sheathing is chosen to provide the desired strength and/or bending ability for any installation. For high strength, stiff probe installations an outer tube 72 may be drawn or swaged down on the sheathing 14 as shown in FIG. 5.

FIG. 8 shows a modification of the series connected heating element formed by a heating cable 74 which includes an outer, continuous sheath 76 of conducting material encasing alternate sections of low resistance conducting material 34' and high resistance heating material 32' welded to each other. The heating cable 74 will provide independent strength for a differential, internal heating arrangement.

The differential heating arrangement hereinbefore described with respect to FIG. 1, will provide more sensitive monitoring of ascending liquid level, suitable as a tank draining alarm for example. For more sensitive monitoring of descending liquid level, the probe assembly may be modified as shown in FIG. 6 so that the heating elements 32" will be positioned adjacent the upper thermocouple junctions 22.

According to the modification shown in FIG. 7, both junctions 22 and 24 of each sensor are heated through the body 16' by one heater element 78. Axial heat flow control and differential signal generation is effected by providing reduced diameter gaps 80 in the body 16' so as to reduce the radially outward heat flow path to one of the thermocouple junctions such as the lowermost junction 24 shown in FIG. 7.

In all embodiments of the invention, the two junctions of each sensor are unequally heated by a predetermined amount so as to produce a differential signal that is substantially unaffected by localized temperature variations in the body of liquid or air. Further, through the differential junction heating arrangement, axial heat flow between sensor locations may be controlled to correctively modify deviation of the combined signal output 42 from a linear function 48 of liquid level as depicted in FIG. 9. Axial heat flow may be additionally controlled by regulating the heating energy level where heating elements 32, 32', or 32" are utilized to internally heat the body of the probe.

What is claimed is:

1. In a liquid level monitoring probe having an axially elongated sheathing, an electrically insulating and heat conductive body enclosed by said sheathing, a plurality of temperature sensors respectively embedded in said body within separate, axially spaced measurement zones, each of said sensors having at least two thermocouple junctions, wherein the two thermocouple junctions of each temperature sensor are located in the respective measurement zone, and means within said body for unequally heating the two thermocouple junctions within each respective measurement zone, the improvement comprising, conductor means electrically interconnecting all of the temperature sensors and thereby all of the thermocouple junctions in series for producing a combined output signal and axial heat flow control means operatively connected to said heating means for modifying the combined output signal.

2. The improvement as defined in claim 1 including data processing means operatively connected to the conductor means for correcting the modified output signal in accordance with a substantially linear function of liquid level between the measurement zones.

3. The improvement as defined in claim 2 wherein said axial heat flow control means comprises electrical power supply means connected to the data processing means for controlling supply of heating energy to the heating means.

4. The combination of claim 3 wherein the heating means comprises a plurality of electrical heating elements interconnected in series and positioned in radial heat transfer relation to one of the two thermocouple junctions within each of the measurement zones.

5. The combination of claim 3 wherein the heating means includes heat generating means for heating the body, and means for reducing heat transfer through the body within the measurement zones.

6. The combination of claim 1 wherein said axial heat flow control means includes axial heat flow reducing means in the body positioned within each of the measurement zones in radial heat transfer relation to one of the two thermocouple junctions therein.

7. In a liquid level monitoring probe having a plurality of differential temperature sensors, each sensor having two junctions, the sensors axially spaced from each other at predetermined levels in the monitoring probe, each predetermined level defining a measurement zone, and heating means for inducing differential signals in the sensors, the two junctions of each sensor are located in a respective measurement zone, the improvement comprising means interconnecting all of the sensors in series for producing a summation of said differential signals, and means for controlling axial heat flow between said measurement zones to correctively modify deviations of the summation of said differential signals from a substantially linear function of liquid level between said predetermined levels.

8. The combination of claim 7 wherein said heating means includes a plurality of electrical heating elements connected in series to the axial heat flow controlling means, said heating elements being positioned in operative relation to the sensors to produce the differential signals therefrom.

* * * * *